United States Patent [19]
Walsh

[11] Patent Number: 6,110,612
[45] Date of Patent: Aug. 29, 2000

[54] STRUCTURE FOR COMMON ACCESS AND SUPPORT OF FUEL CELL STACKS

[75] Inventor: Michael M. Walsh, Fairfield, Conn.

[73] Assignee: Plug Power Inc., Latham, N.Y.

[21] Appl. No.: 09/294,719

[22] Filed: Apr. 19, 1999

[51] Int. Cl.[7] .................................................. H01M 8/04
[52] U.S. Cl. ............................... 429/13; 429/34; 429/99; 429/100
[58] Field of Search .................................. 429/34, 32, 13, 429/99, 100

[56] References Cited

U.S. PATENT DOCUMENTS

| | | |
|---|---|---|
| 737,613 | 9/1903 | Halsey . |
| 3,160,528 | 12/1964 | Dengler et al. . |
| 3,880,670 | 4/1975 | Shinn . |
| 4,548,875 | 10/1985 | Lance et al. ................................ 429/26 |
| 4,578,324 | 3/1986 | Koehler et al. ......................... 429/34 X |
| 5,270,127 | 12/1993 | Koga et al. ................................. 429/17 |
| 5,298,341 | 3/1994 | Khandkar et al. ......................... 429/32 |
| 5,387,477 | 2/1995 | Cheiky ....................................... 429/26 |
| 5,390,754 | 2/1995 | Masuyama et al. ................ 429/100 X |
| 5,403,679 | 4/1995 | Stone ................................... 429/100 X |
| 5,419,979 | 5/1995 | Garshol et al. ............................ 429/27 |
| 5,532,072 | 7/1996 | Spaeh et al. ............................... 429/34 |
| 5,543,240 | 8/1996 | Lee et al. ................................... 429/38 |
| 5,549,983 | 8/1996 | Yamanis .................................... 429/32 |
| 5,571,630 | 11/1996 | Cheiky ....................................... 429/26 |
| 5,932,365 | 8/1999 | Lin et al ............................... 429/34 X |

Primary Examiner—Stephen Kalafut
Attorney, Agent, or Firm—Heslin & Rothenberg, P.C.

[57] ABSTRACT

A structure provides common support and access to multiple fuel cells externally mounted thereto. The structure has openings leading to passages defined therein for providing the access. Various other fuel cell power system components are connected at the openings, such as reactant and coolant sources.

44 Claims, 11 Drawing Sheets

STRUCTURE FOR COMMON ACCESS AND SUPPORT OF FUEL CELL STACKS

STATEMENT OF GOVERNMENT RIGHTS

The Government of the United States of America has certain rights in this invention pursuant to Contract No. DE-AC02-94CE50389 awarded by the U.S. Department of Energy.

BACKGROUND OF THE INVENTION

1. Technical Field

The present invention generally relates to fuel cells. More particularly, the present invention relates to structures for supporting and accessing fuel cell stacks.

2. Background Information

The development of fuel cell technology has taken on increased significance in recent years. However, while research and development into the fuel cells themselves has increased, there has been no corresponding focus on how to support and access the fuel cells, which are generally grouped into "stacks".

Typically, separate services, for example, conduits, are used to supply reactants (e.g., fuel) to and remove byproducts (e.g., water) from the fuel cell stacks. In addition, fuel cell stacks are not generally arranged in any coherent manner, merely being placed on a surface in the vicinity of the other fuel cell stacks. This "hodge podge" approach to support and access to fuel cell stacks creates a confusing and unnecessarily complex environment in which to operate or test the fuel cells. In addition, such an arrangement wastes what might be valuable space in many applications.

Thus, a need exists for a way to provide efficient support and access to multiple fuel cell stacks.

SUMMARY OF THE INVENTION

Briefly, the present invention satisfies the need for efficient support and access to multiple fuel cells by providing a common structure for support and access of multiple fuel cells arranged into fuel cell stacks.

In accordance with the above, it is an object of the present invention to provide a structure for support of multiple fuel cell stacks.

It is another object of the present invention to provide a structure for access to multiple fuel cell stacks.

It is still another object of the present invention to provide structure for common support of multiple fuel cell stacks.

It is yet another object of the present invention to provide a structure for common access to multiple fuel cell stacks.

The present invention provides, in a first aspect, apparatus for supporting and accessing a plurality of fuel cell stacks. The apparatus comprises a structure for supporting a plurality of fuel cell stacks. The structure is adapted for external coupling of the fuel cell stacks, and includes a plurality of passages defined therein for accessing the plurality of fuel cell stacks when externally coupled to the structure.

The present invention provides, in a second aspect, a fuel cell power system. The system comprises a plurality of fuel cell stacks and a structure for supporting them. The structure is adapted for external coupling of the fuel cell stacks, and includes a plurality of passages defined therein for accessing the fuel cell stacks when externally coupled to the structure.

The present invention provides, in a third aspect, a method of constructing and operating a fuel cell power system. The method comprises providing a plurality of fuel cell stacks, and a structure for supporting and accessing the fuel cell stacks. The method further comprises externally coupling the plurality of fuel cell stacks to the structure, which includes a plurality of passages defined therein, and accessing the fuel cell stacks via the passages.

These, and other objects, features and advantages of this invention will become apparent from the following detailed description of the various aspects of the invention taken in conjunction with the accompanying drawings.

BEST MODE FOR CARRYING OUT THE INVENTION

Fuel cells electrochemically convert fuels and oxidants to electricity, and fuel cells can be categorized according to the type of electrolyte (e.g., solid oxide, molten carbonate, alkaline, phosphoric acid, or solid polymer) used to accommodate ion transfer during operation. Moreover, fuel cell assemblies can be employed in many (e.g., automotive to aerospace to industrial) environments, for multiple applications.

A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactants (e.g., hydrogen and air/oxygen gases). Some artisans consider the acronym "PEM" to represent "Polymer Electrolyte Membrane." The direction, from anode to cathode, of flow of protons serves as the basis for labeling an "anode" side and a "cathode" side of every layer in the fuel cell, and in the fuel cell assembly or stack.

Usually, an individual PEM-type fuel cell has multiple, generally transversely extending layers assembled in a longitudinal direction. In the typical fuel cell assembly or stack, all layers which extend to the periphery of the fuel cells have holes therethrough for alignment and formation of fluid manifolds that generally service fluids for the stack. As is known in the art, some of the fluid manifolds distribute fuel (e.g., hydrogen) and oxidant (e.g., air/oxygen) to, and remove unused fuel and oxidant as well as product water from, fluid flow plates which serve as flow field plates for each fuel cell. Also, other fluid manifolds circulate coolant (e.g., water) for cooling.

As is known in the art, for the PEM to work effectively it must be wet. Conversely, once any area of the PEM dries out, the fuel cell does not generate any product water in that area because the electrochemical reaction there stops. Undesirably, this drying out can progressively march across the PEM until the fuel cell fails completely. So, the fuel and oxidant fed to each fuel cell are usually humidified. Furthermore, a cooling mechanism is commonly employed for removal of heat generated during operation of the fuel cells.

Although the present invention will be described with reference to a PEM-type fuel cell system, it will be understood that it is applicable to other systems employing other types of fuel cells.

Figure 1:
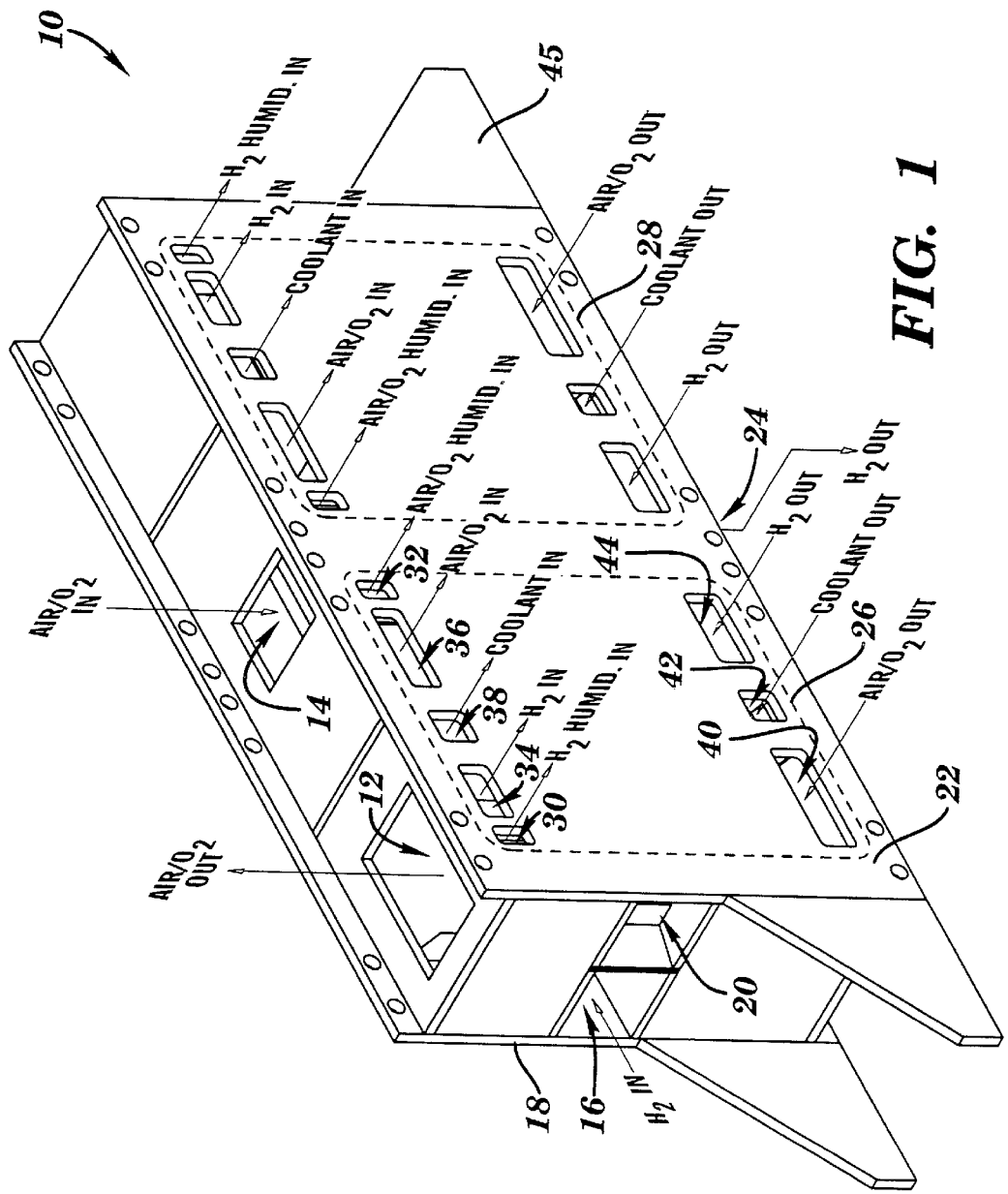
FIG. 1 depicts one exemplary embodiment of the structure of the present invention.

FIG. 1 depicts one embodiment of a structure 10 in accordance with the present invention. For reasons made clear below, structure 10 might also be referred to as the "spine" of a fuel cell system according to the present invention. Structure 10 provides support and access to multiple fuel cell stacks (see FIGS. 10 and 11). As used herein, the term "fuel cell stack" is defined as one or more individual fuel cells coupled together. As noted above, fuel cells generally require reactants, a coolant and possibly humidification. PEM-type fuel cells require a fuel source (e.g., hydrogen), an oxidant source (air and/or oxygen), and water for both cooling and humidification.

Structure 10 comprises a number of openings to internal passages (see, e.g., FIG. 3) for guiding the fuel, oxidant and water of the reaction process into and out of the fuel cell stacks. Opening 12 is the common output for air/oxygen for all the fuel cell stacks when connected to the structure, which might be connected to an expander (see FIG. 11). Similarly, opening 14 serves as the common input for an oxidant (in this example, air/oxygen) for all the stacks, and might be connected to a compressor (see FIG. 11). Opening 16 is the fuel input (in this example, hydrogen) for fuel cell stacks connected to face 18 of structure 10. Opening 20 serves the same purpose for fuel cell stacks connected to face 22 of structure 10. Opening 16 and opening 20 may be connected to a common supply conduit. Opening 24 is the common fuel output for all the fuel cell stacks when connected to the structure, which might be connected to a fuel collector (see FIG. 11).

The functions of the various openings on face 22 of structure 10 will now be described. It will be understood that face 18 is the mirror image of face 22 and its openings have similar functions for the fuel cell stacks connected thereto. In addition, it can be seen from FIG. 1 that opening group 26 is the mirror image of opening group 28, with similar functions for a different fuel cell stack. Therefore, only the functions for openings in group 26 will be explained in detail.

Figure 10:
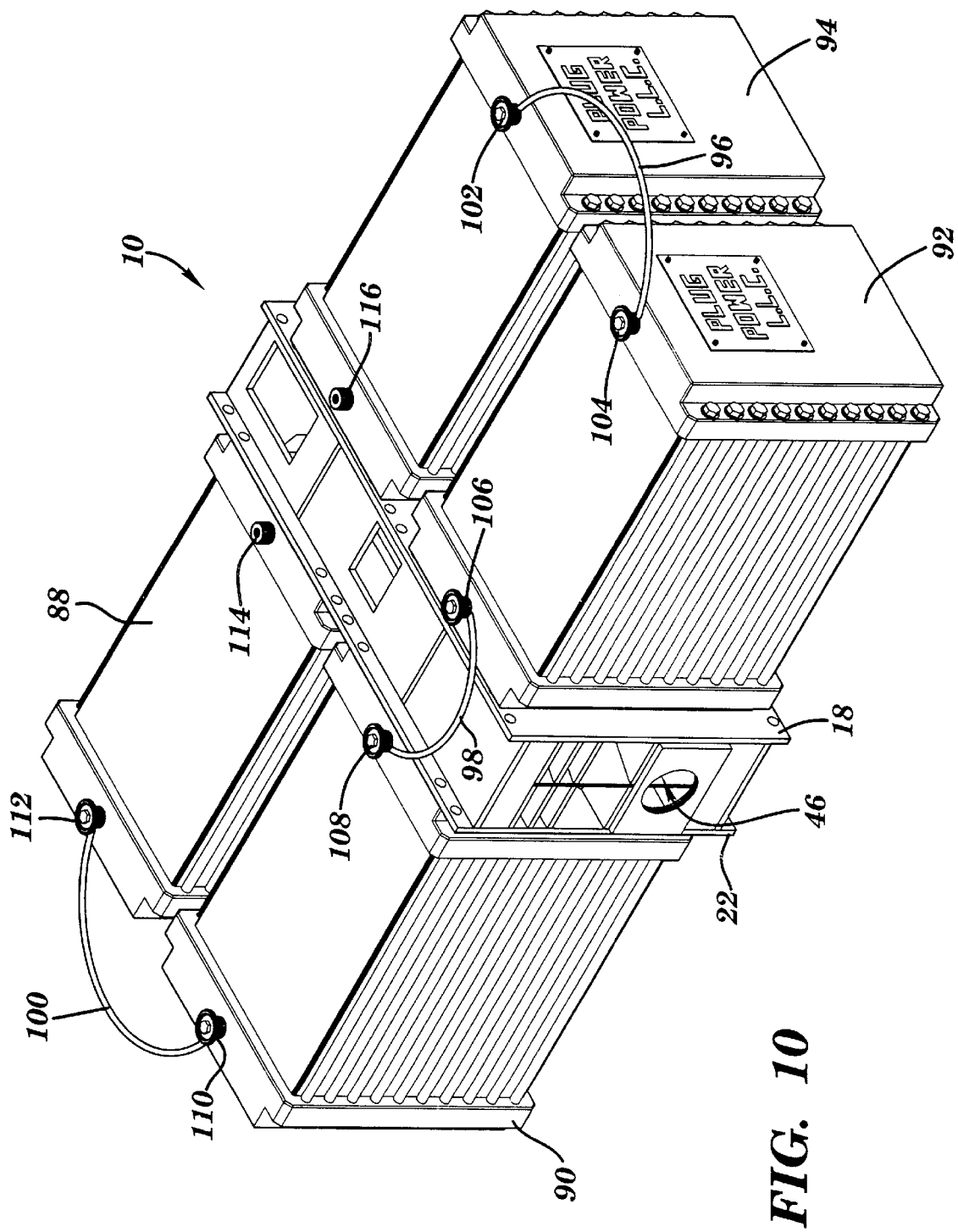
FIG. 10 depicts multiple fuel cell stacks coupled to the structure of FIGS. 1 and 2.

Opening group 26 supplies fuel, oxidant and water to a fuel cell stack serviced thereby (see FIG. 10). Openings 30 and 32 are the inputs for fuel and air/oxygen humidification water, respectively, to the fuel cell stack serviced by group 26. Similarly, openings 34 and 36 are the inputs for fuel and air/oxygen, respectively. Opening 38 is the input for coolant, in this case, water. Openings 40, 42 and 44 are the air/oxygen, coolant and hydrogen outputs, respectively, for the fuel cell stack serviced by group 26. In addition, optional stabilizers (e.g., stabilizer 45) may be added to provide mounting points or to help make the structure more stable.

Figure 2:
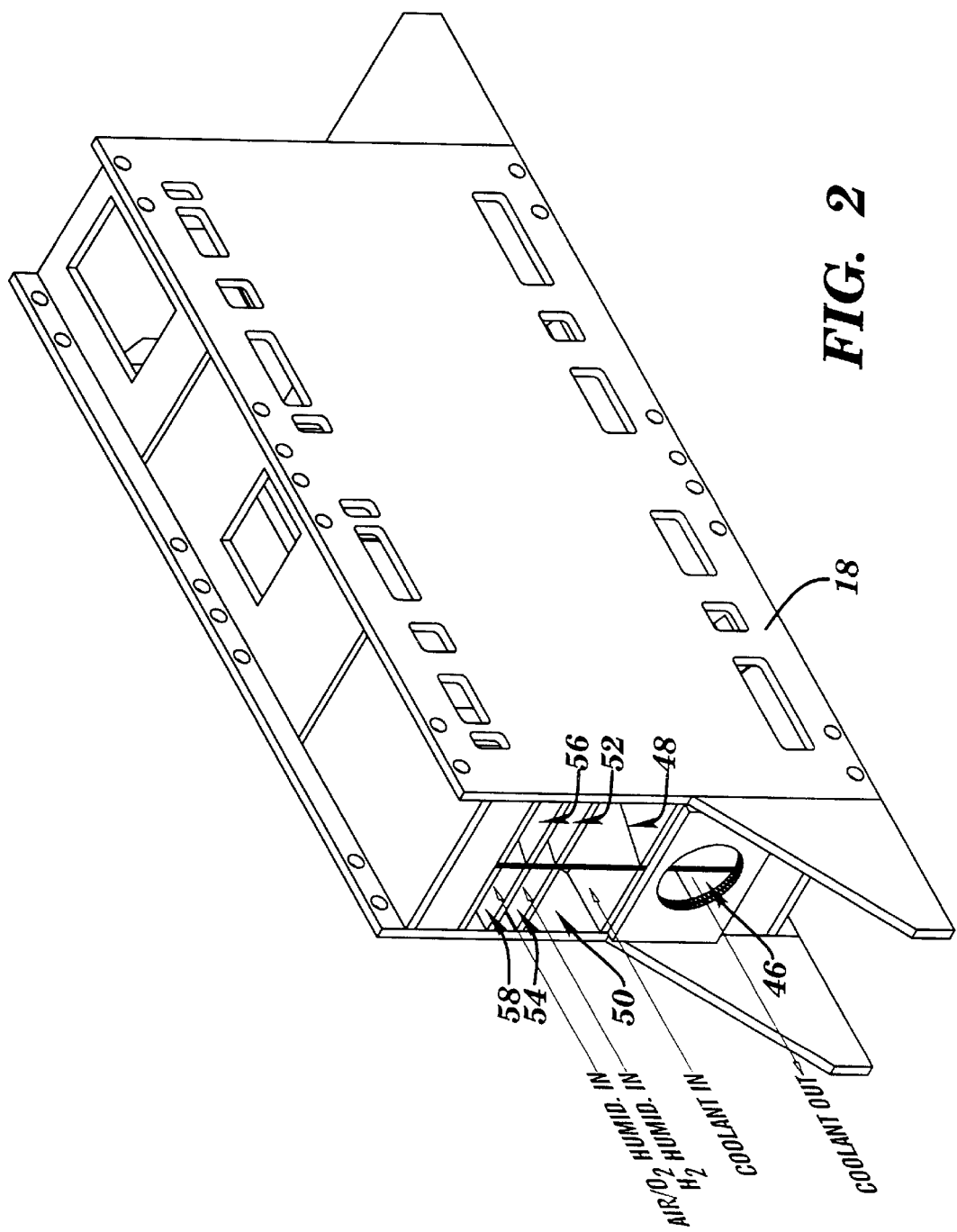
FIG. 2 depicts the structure of FIG. 1 from the opposite end.

FIG. 2 depicts structure 10 from the face 18 side. Opening 46 serves as a common output for coolant from the various fuel cell stacks, and might be connected to a coolant collector (see FIG. 11). Opening 48 is a coolant input for the fuel cell stacks serviced on the face 18 side, while opening 50 serves the same purpose for the fuel cell stacks on the face 22 side. Openings 48 and 50 may be connected to a common supply conduit. Opening 52 serves as a fuel humidification water input for the fuel cell stacks serviced on the face 18 side, while opening 54 serves the same purpose for the face 22 side. Finally, opening 56 is an air/oxygen input for the fuel cell stacks serviced on the face 18 side, while opening 58 serves a similar purpose for the fuel cell stacks serviced on the face 22 side.

Figure 3:
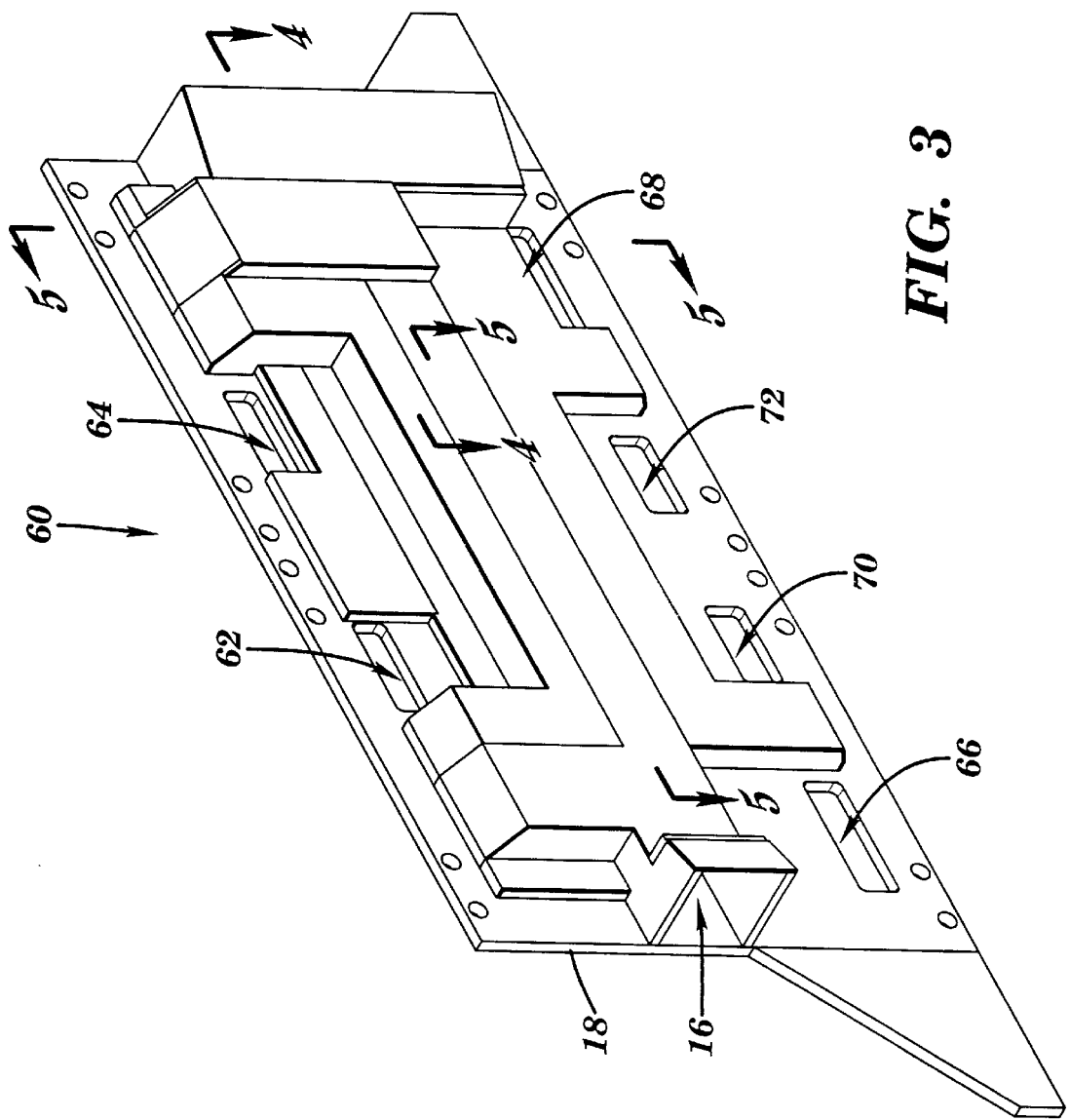
FIG. 3 is a cut-away perspective view of a first half of the structure of FIG. 1.

FIG. 3 is an interior view of structure 10 on the face 18 side, showing the internal passages or ductwork 60 for guiding fuel, oxidant and water to/from the fuel cell stacks serviced on the face 18 side. As described indirectly above, openings 62 and 64 are air/oxygen inputs for the fuel cell stacks serviced on the face 18 side of structure 10. In addition, openings 66 and 68 are air/oxygen outputs from the face 18 side fuel cell stacks, while openings 70 and 72 serve as residual fuel outputs.

Figure 4:
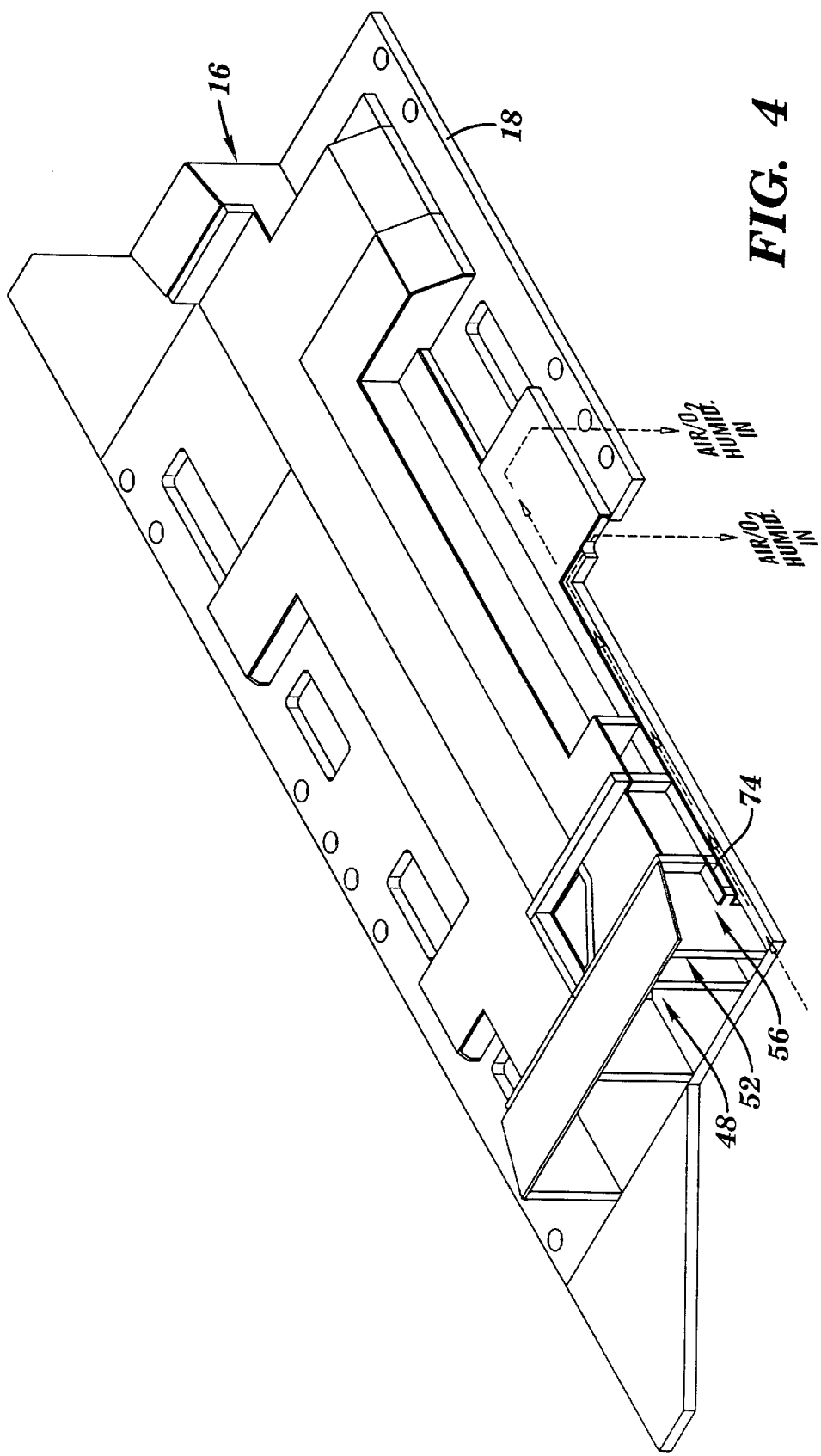
FIGS. 4–8 are partially cut-away views of the first portion of the structure depicted in FIG. 3, showing the passages defined within the structure in greater detail.
Figure 5:
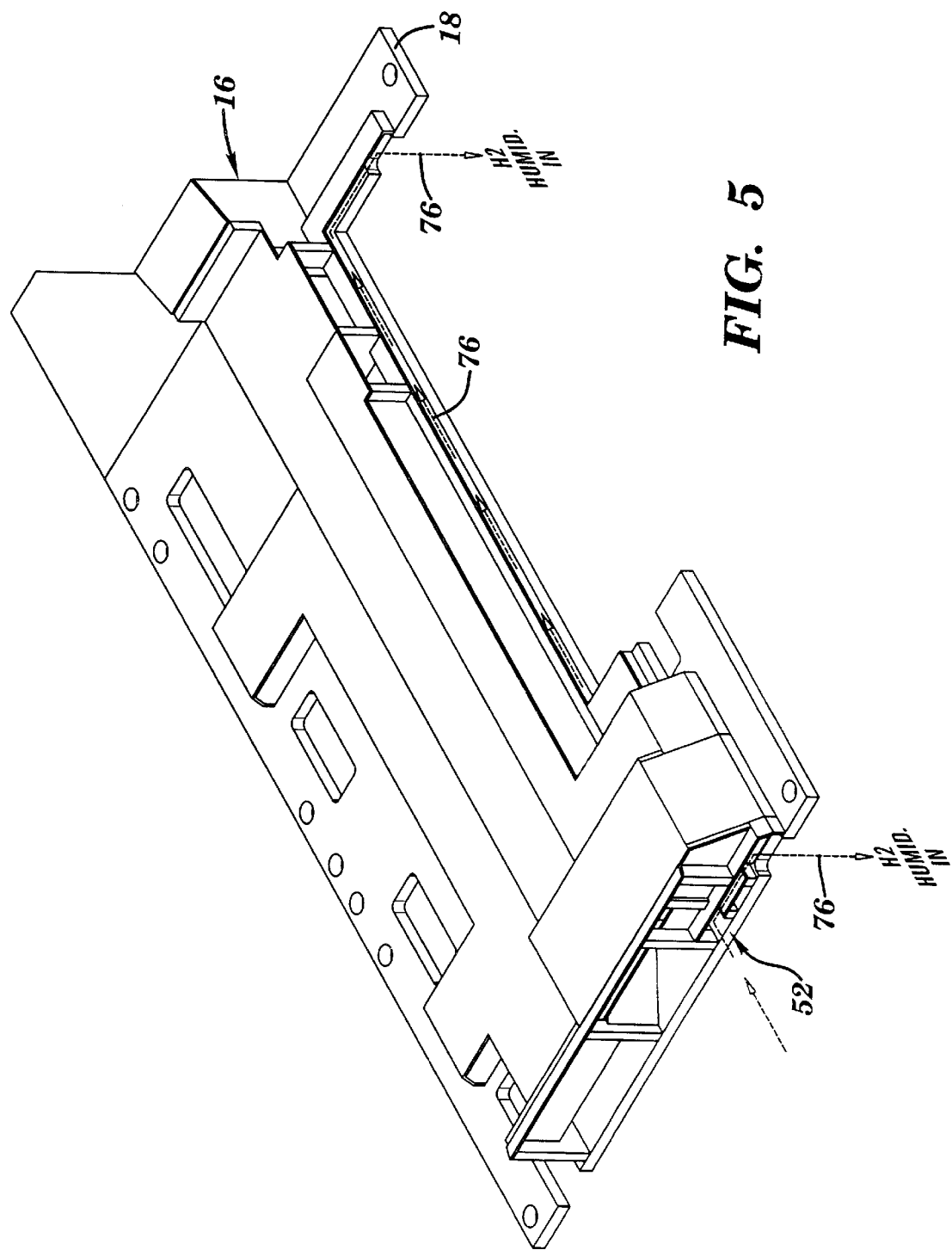
Figure 6:
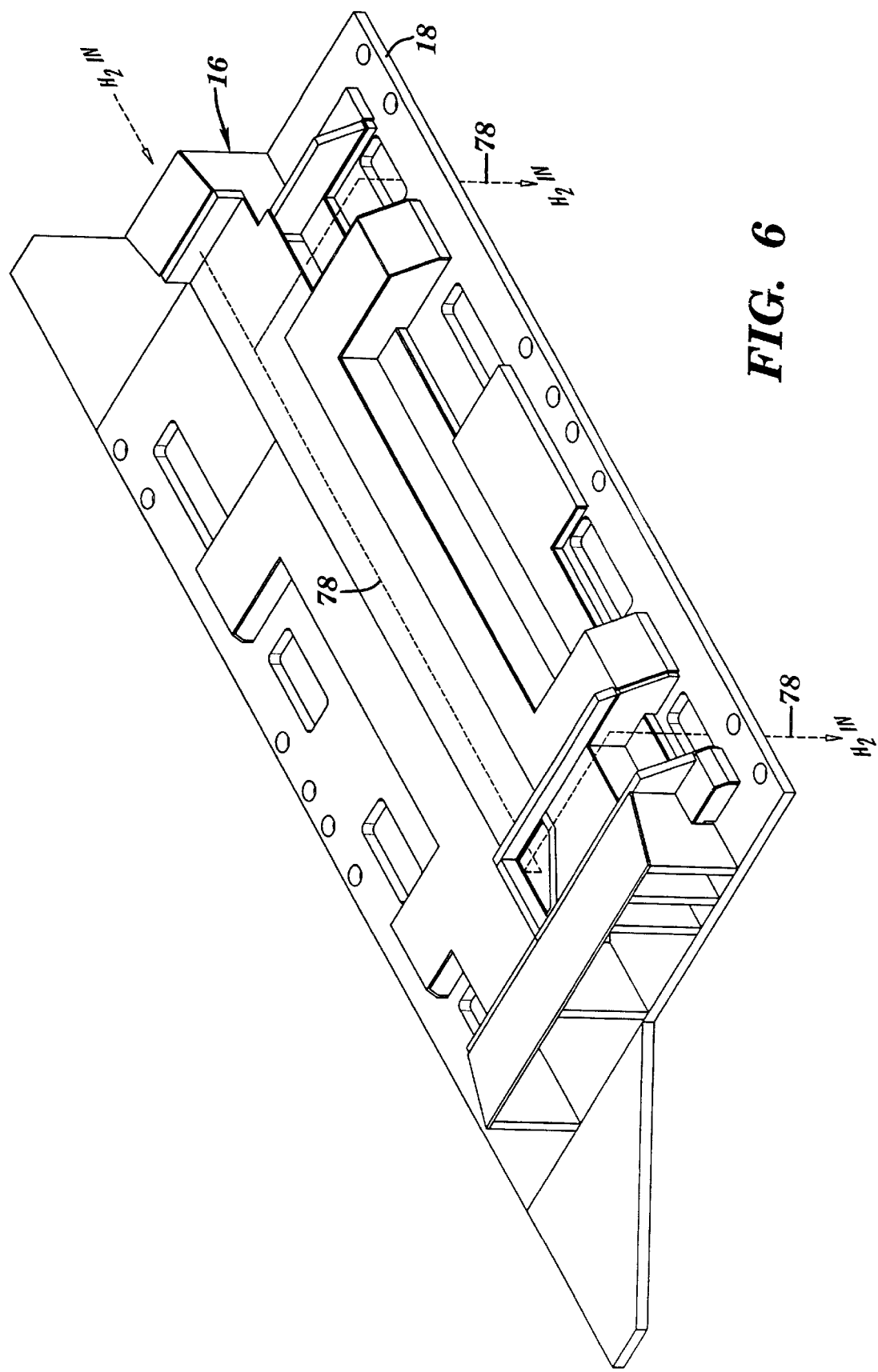
Figure 7:
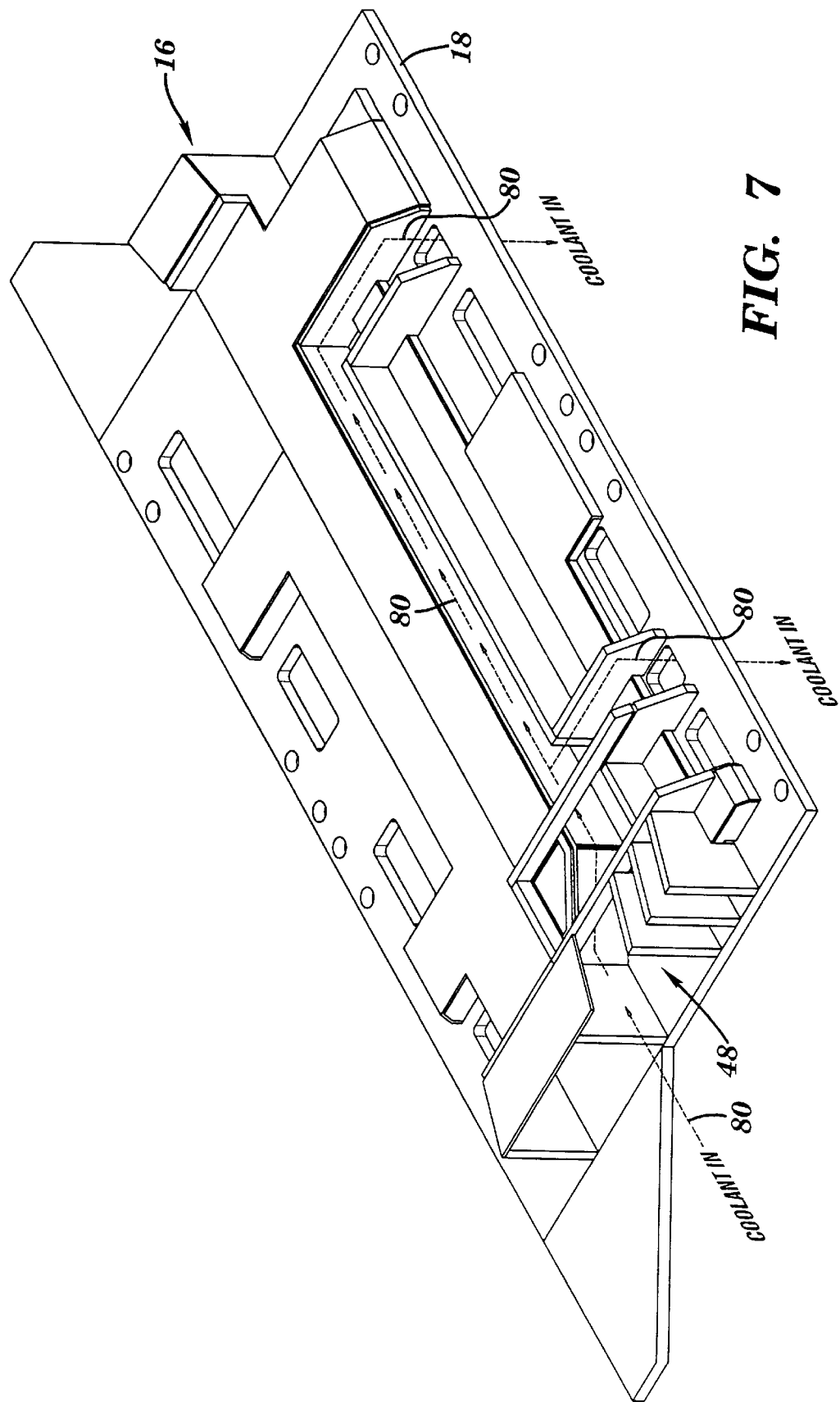
Figure 8:
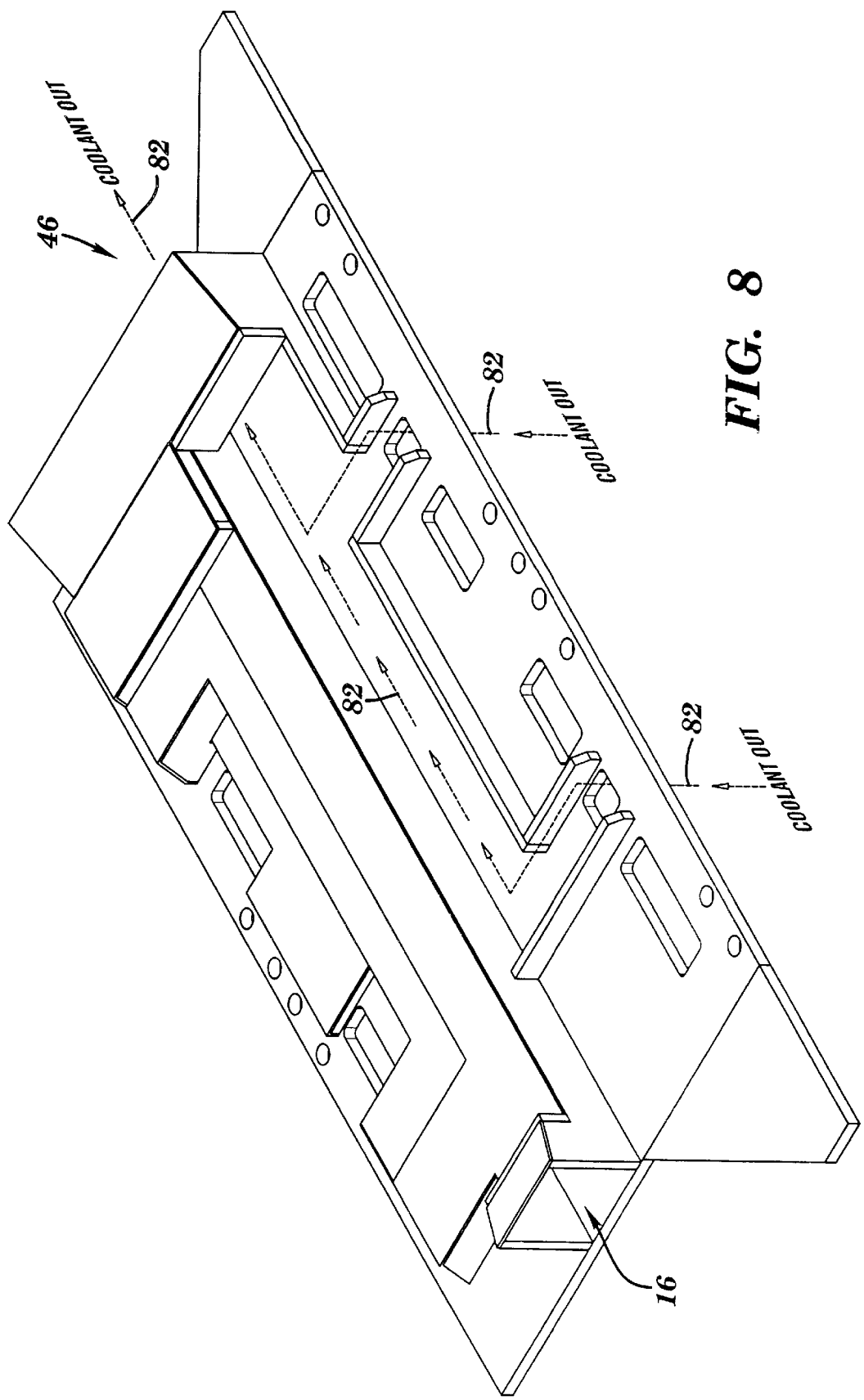

FIGS. 4–8 are partial cut-away views of FIG. 3 to better show the passages. FIG. 4 shows the path 74 for the air/oxygen humidification water from opening 56 to the fuel cell stacks serviced on the face 18 side. FIG. 5 shows the path 76 for the fuel humidification water from opening 52 to the fuel cell stacks serviced on the face 18 side. FIG. 6 shows the path 78 for fuel input from opening 16 to the fuel cell stacks serviced on the face 18 side. FIG. 7 shows the path 80 for coolant input from opening 48 to the fuel cell stacks serviced on the face 18 side. Finally, FIG. 8 shows the path 82 for coolant output from the fuel cell stacks on the face 18 side to opening 46.

Figure 9:
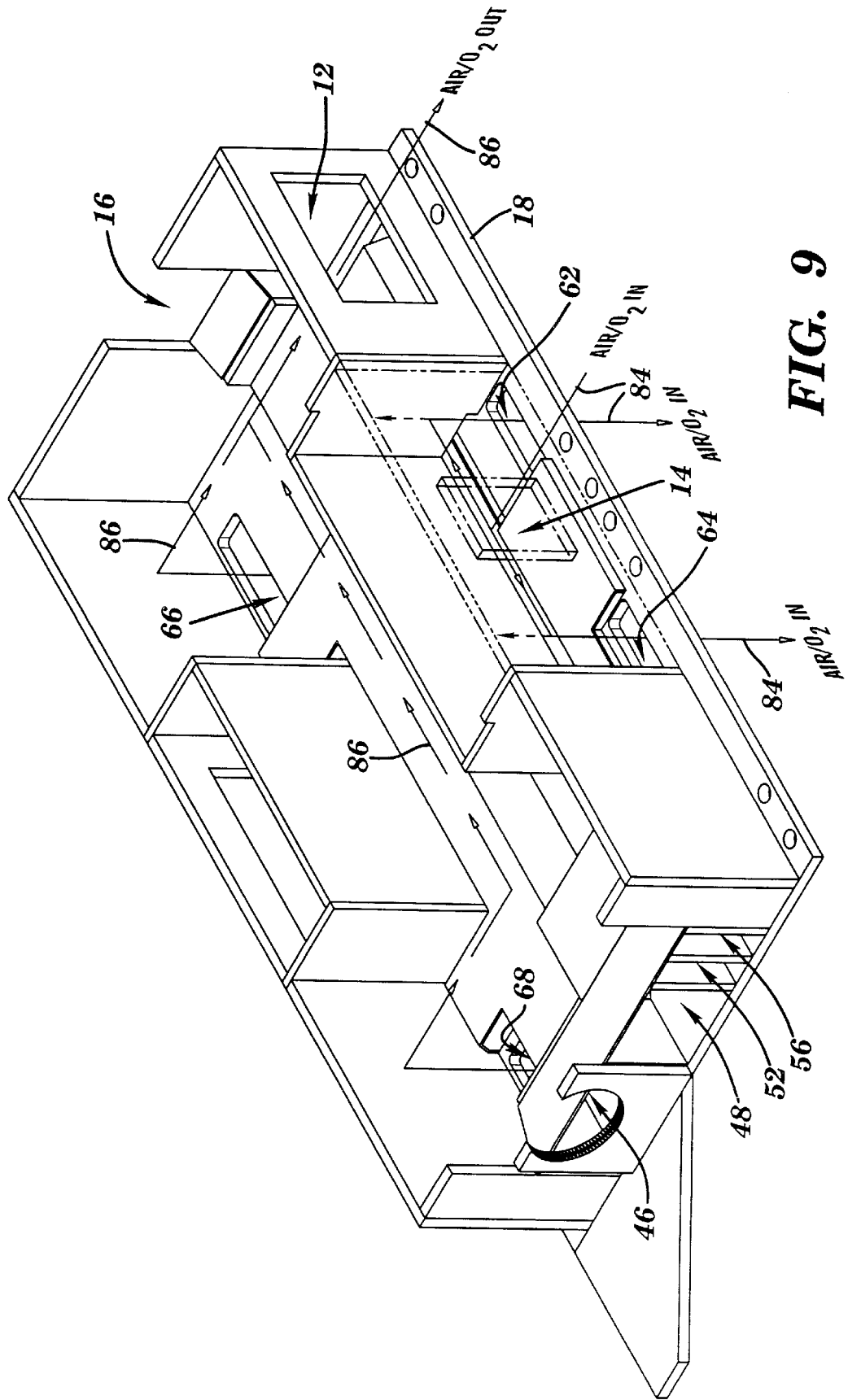
FIG. 9 is a cut-away view of the structure depicted in FIG. 2.

FIG. 9 is a cut-away view of the face 18 side and surrounding sides of the structure 10 of FIG. 1. Shown in FIG. 9 are the air/oxygen flow paths for structure 10. Shown in phantom is air/oxygen input opening 14, and the adjacent input air/oxygen flow path 84. The air/oxygen enters opening 14 and, on the face 18 side, enters the fuel cell stacks serviced on that side through openings 62 and 64. The air/oxygen would also enter the fuel cell stacks serviced on the face 22 side through opening 36 and the corresponding opening in group 28. The output air/oxygen flow path 86 is also shown. Air/oxygen from the fuel cell stacks serviced on the face 18 side of structure 10 enters through openings 66 and 68, and exits through opening 12 to, for example, an expander (see FIG. 11). Similarly, air/oxygen from the fuel cell stacks serviced on the face 22 side exits through opening 12 and enters through opening 40 and the corresponding opening in group 28.

FIG. 10 depicts the structure 10 of FIG. 2 with multiple PEM-type fuel cell stacks 88, 90, 92 and 94 coupled thereto. The fuel cell stacks are preferably cantilevered from faces 18 and 22 of structure 10 by conventional means, such that they are balanced and the center of mass for the structure and fuel cell stacks together lies within the structure itself. This arrangement lends stability to a fuel cell power system including the structure. Although four fuel cell stacks are shown, it will be understood that the structure could be made to accommodate more or less fuel cell stacks. In addition, the fuel cell stacks might also be arranged differently. For example, the structure could support eight fuel cell stacks in two "layers".

Also shown in FIG. 10 are the electrical connections 96, 98 and 100 between the fuel cell stack terminals. The negative terminal 102 of stack 94 is connected to the positive terminal 104 of stack 92. The negative terminal 106 of stack 92 is connected to the positive terminal 108 of stack 90. Finally, the negative terminal 110 of stack 90 is connected to the positive terminal 112 of stack 8,8. In short, the fuel cell stack terminals are connected in a daisy-chain arrangement, which allows each fuel cell to be electrically isolated from structure 10, in order to prevent accidental short circuits, which could be dangerous given the direct current of the fuel cells. Terminals 114 and 116 are left unconnected, and are used as external terminals for connecting to a load. It will be understood that, although a daisy-chain arrangement is shown and preferred, other arrangements are possible and other terminals could be designated for external connections.

Figure 11:
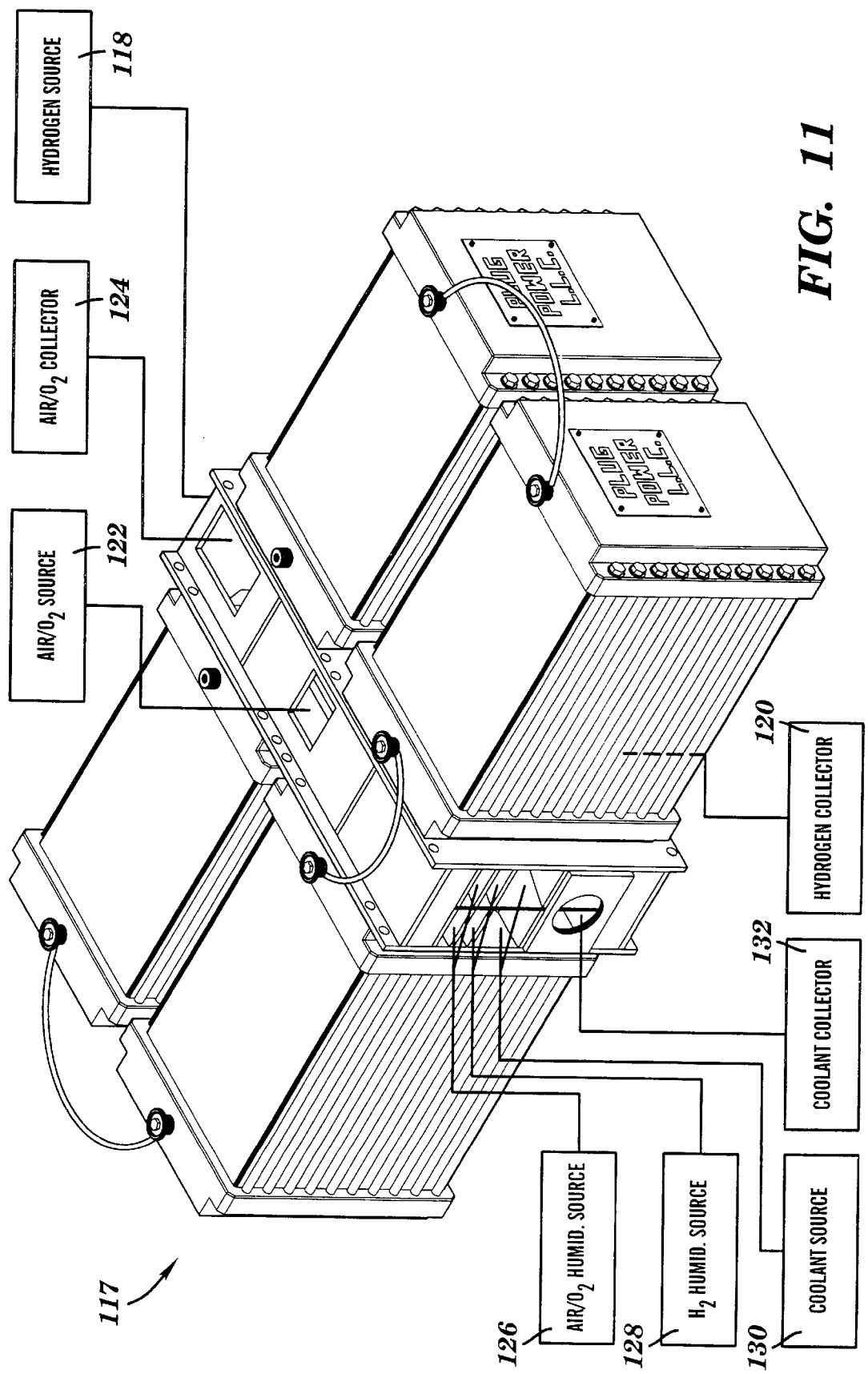
FIG. 11 depicts a fuel cell system in accordance with the present invention.

FIG. 11 is a partial block diagram of a fuel cell power system 117 in accordance with the present invention. The structure 10 and fuel cell stacks 88, 90, 92 and 94 of FIG. 10 are shown connected to external system components providing, for example, reactants and coolant. Fuel source 118 (e.g., a hydrogen gas tank) is connected to openings 16 and 20, while fuel collector 120 is connected to opening 24. Air/oxygen source 122 (e.g., a compressor) is connected to opening 14, while air/oxygen collector 124 (e.g., an expander) is connected to opening 12. Preferably, a positive displacement expander is used, but a properly designed dynamic (e.g., turbine) expander could also be used. Humidification water source 126 is connected to openings 56 and 58 for humidifying the air/oxygen, and humidification water source 128 is connected to openings 52 and 54 for humidifying the fuel. Humidification water is typically supplied by pumps drawing deionized water from one or more reservoirs. Coolant source 130 (e.g., a pump) is connected to openings 48 and 50, while coolant collector 132 (e.g., a conduit to a heat exchanger or radiator) is connected to opening 46. Of course, the coolant source and coolant collector might be one and the same, constantly recycling the coolant through an external heat exchanger. As shown and described, structure 10 allows for centralized servicing of all the fuel cell stacks in a given fuel cell power system.

Fuel collector 120 can take on various forms, depending on the precise design and construction of the other fuel system components.

In a first embodiment, where the fuel is pure hydrogen, and the amount supplied is in excess of the amount consumed by the electrochemical reaction, residual fuel not consumed by the reaction can be collected and recirculated to the inlet of the stack under the influence of, for example, an aspirator driven by the pressure of make-up fuel from a pressurized vessel.

In a second embodiment, the unconsumed fuel can be recirculated to the inlet of the fuel cell stack by the action of a pump or blower powered from an external source.

In a third embodiment, for example in fuel cell systems where the fuel is a hydrogen-rich mixture of gasses produced by chemically reforming hydrocarbons, the fuel collector may simply be a conduit which returns the unreacted fuel and other components of the mixture to the reformer where the residual fuel is oxidized to provide part of the heat needed by the reforming process.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. Apparatus for supporting and accessing a plurality of fuel cell stacks, comprising:

a structure for supporting a plurality of fuel cell stacks, wherein the structure is adapted for external coupling of the plurality of fuel cell stacks; and a plurality of passages defined within the structure for accessing the plurality of fuel cell stacks when coupled to the structure.

2. The apparatus of claim 1, wherein the plurality of fuel cell stacks comprise a plurality of proton exchange membrane (PEM) fuel cells, and wherein the plurality of passages guide hydrogen, water, and at least one of air and oxygen into and out of the plurality of PEM fuel cells when coupled to the structure.

3. The apparatus of claim 1, wherein the structure comprises a plurality of openings for coupling to external power system components.

4. The apparatus of claim 1, wherein the structure is adapted to be centralized among the plurality of fuel cell stacks when coupled thereto.

5. The apparatus of claim 4, wherein a center of mass for the structure and the plurality of fuel cell stacks, when coupled thereto, lies within the structure.

6. A fuel cell power system, comprising:

a plurality of fuel cell stacks;

a structure for supporting the plurality of fuel cell stacks, wherein the structure is adapted for external coupling of the plurality of fuel cell stacks; and a plurality of passages defined within the structure for accessing the plurality of fuel cell stacks when coupled to the structure.

7. The fuel cell power system of claim 6, wherein the plurality of fuel cell stacks comprise a plurality of PEM fuel cells, and wherein the plurality of passages guide hydrogen, water, and at least one of air and oxygen into and out of the plurality of PEM fuel cells when coupled to the structure.

8. The fuel cell power system of claim 6, wherein the plurality of fuel cell stacks are coupled to the structure so as to be electrically isolated therefrom.

9. The fuel cell power system of claim 8, wherein the plurality of fuel cell stacks are electrically connected together in a daisy chain arrangement.

10. The fuel cell power system of claim 6, wherein the structure comprises a plurality of openings for coupling to external power system components.

11. The fuel cell power system of claim 10, wherein the external power system components comprise a reactant source.

12. The fuel cell power system of claim 11, wherein the plurality of fuel cell stacks comprise a plurality of PEM fuel cells, and wherein the reactant source comprises a hydrogen source.

13. The fuel cell power system of claim 11, wherein the plurality of fuel cell stacks comprise a plurality of PEM fuel cells, and wherein the reactant source comprises at least one of an air source and an oxygen source.

14. The fuel cell power system of claim 13, wherein the at least one of an air source and an oxygen source comprises a compressor.

15. The fuel cell power system of claim 11, wherein the external power system components comprise a reactant collector.

16. The fuel cell power system of claim 15, wherein the reactant collector comprises an expander.

17. The fuel cell power system of claim 10, wherein the external power system components comprise a coolant source.

18. The fuel cell power system of claim 17, wherein the external power system components comprise a coolant collector.

19. The fuel cell power system of claim 10, wherein the external power system components comprise a humidity source.

20. The fuel cell power system of claim 6, wherein the structure is centralized among the plurality of fuel cell stacks when coupled thereto.

21. The fuel cell power system of claim 20, wherein a center of mass for the structure and the plurality of fuel cell stacks, when coupled thereto, lies within the structure.

22. A method of constructing and operating a fuel cell power system, comprising:

providing a plurality of fuel cell stacks;

providing a structure for supporting and accessing the plurality of fuel cell stacks;

externally coupling the plurality of fuel cell stacks to the structure, the structure including a plurality of passages defined therein; and accessing the plurality of fuel cell stacks via the plurality of passages.

23. The method of claim 22, wherein the providing comprises providing a plurality of proton exchange membrane (PEM) fuel cell stacks, wherein the externally coupling comprises externally coupling the plurality of PEM fuel cell stacks to the structure, and wherein the accessing comprises accessing the plurality of PEM fuel cell stacks via the plurality of passages to supply hydrogen, water, and at least one of air and oxygen thereto.

24. The method of claim 22, wherein the structure comprises a plurality of openings for coupling to external power system components, the method further comprising coupling power system components to the structure via the plurality of openings.

25. The method of claim 24, wherein the coupling power system components comprises coupling one or more reactant sources to the structure.

26. The method of claim 25, wherein the plurality of fuel cell stacks comprise a plurality of PEM fuel cells, and wherein the coupling one or more reactant sources comprises coupling a hydrogen source.

27. The method of claim 26, wherein the coupling one or more reactant sources further comprises coupling at least one of an air source and an oxygen source.

28. The method of claim 27, wherein the coupling at least one of an air source and an oxygen source comprises coupling a compressor.

29. The method of claim 24, wherein the coupling power system components comprises coupling a coolant source.

30. The method of claim 24, wherein the coupling power system components comprises coupling an expander.

31. The method of claim 22, wherein the externally coupling comprises externally coupling the plurality of fuel cell stacks such that the structure is centralized among the plurality of fuel cell stacks.

32. The method of claim 31, wherein the externally coupling comprises externally coupling the plurality of fuel cell stacks such that a center of mass for the both the structure and the plurality of fuel cell stacks lies within the structure.

33. The method of claim 22, wherein the externally coupling comprises externally coupling the plurality of fuel cell stacks to the structure so as to be electrically isolated therefrom.

34. The method of claim 33, further comprising electrically connecting the plurality of fuel cell stacks in a daisy chain arrangement.

35. A fuel cell power system, comprising:

a structure for supporting a plurality of fuel cell stacks, wherein the structure is adapted for external coupling of the plurality of fuel cell stacks;

a plurality of passages defined within the structure for accessing the plurality of fuel cell stacks when coupled to the structure; and a plurality of openings in the structure for coupling to external power system components.

36. The fuel cell power system of claim 35, further comprising a reactant source for coupling to at least one of the plurality of openings.

37. The fuel cell power system of claim 36, further comprising a plurality of PEM fuel cells for coupling to the structure, and wherein the reactant source comprises a hydrogen source.

38. The fuel cell power system of claim 36, further comprising a plurality of PEM fuel cells for coupling to the structure, and wherein the reactant source comprises at least one of an air source and an oxygen source.

39. The fuel cell power system of claim 38, wherein the at least one of an air source and an oxygen source comprises a compressor.

40. The fuel cell power system of claim 35, further comprising a reactant collector for coupling to at least one of the plurality of openings.

41. The fuel cell power system of claim 40, wherein the reactant collector comprises an expander.

42. The fuel cell power system of claim 35, further comprising a coolant source for coupling to at least one of the plurality of openings.

43. The fuel cell power system of claim 42, further comprising a coolant collector for coupling to at least one of the plurality of openings.

44. The fuel cell power system of claim 35, further comprising a humidity source for coupling to at least one of the plurality of openings.

* * * * *